United States Patent [19]

Jeanneret

[11] 3,710,633

[45] Jan. 16, 1973

[54] MACHINE TOOL CARRIAGES

[76] Inventor: Jules Louis Jeanneret, 13 a 21, rue H. Gelin, Niort, France

[22] Filed: March 29, 1971

[21] Appl. No.: 128,657

[30] Foreign Application Priority Data

April 15, 1970 France..............................7013537

[52] U.S. Cl. ......................74/107, 49/199, 82/34.2
[51] Int. Cl.............................................F16h 21/44
[58] Field of Search.............74/107; 49/199; 82/34.2

[56] References Cited

UNITED STATES PATENTS

| | | | |
|---|---|---|---|
| 1,711,301 | 4/1929 | Zwicky | 82/34.2 |
| 2,131,129 | 9/1938 | Whitehead | 82/34.2 |
| 2,450,788 | 10/1948 | Foster | 82/34.2 |
| 3,076,585 | 2/1963 | Straubel | 74/107 |
| 3,052,329 | 9/1962 | Budofsky | 74/107 |
| 3,220,267 | 11/1965 | Smith | 74/107 |
| 3,513,892 | 5/1970 | Genetti | 74/107 |

*Primary Examiner*—Milton Kaufman
*Assistant Examiner*—Wesley S. Ratliff, Jr.
*Attorney*—Stevens, Davis, Miller & Mosher

[57] ABSTRACT

This invention relates to machine tools of the kind having a bed with slideways thereon and a slide arranged to move on the slideways. In order to enable the slide to be returned to the starting point of the pass, the invention provides a housing secured to the slideways and a rod mounted to move with the slide: the rod carries a spindle on which is mounted a control wheel which rotates against the periphery of a cam pivoted on a pivot pin in the housing perpendicularly to the sliding rod and an operating lever is secured to the pivot pin.

4 Claims, 5 Drawing Figures

United States Patent [19]
Jeanneret
[11] 3,710,633
[45] Jan. 16, 1973
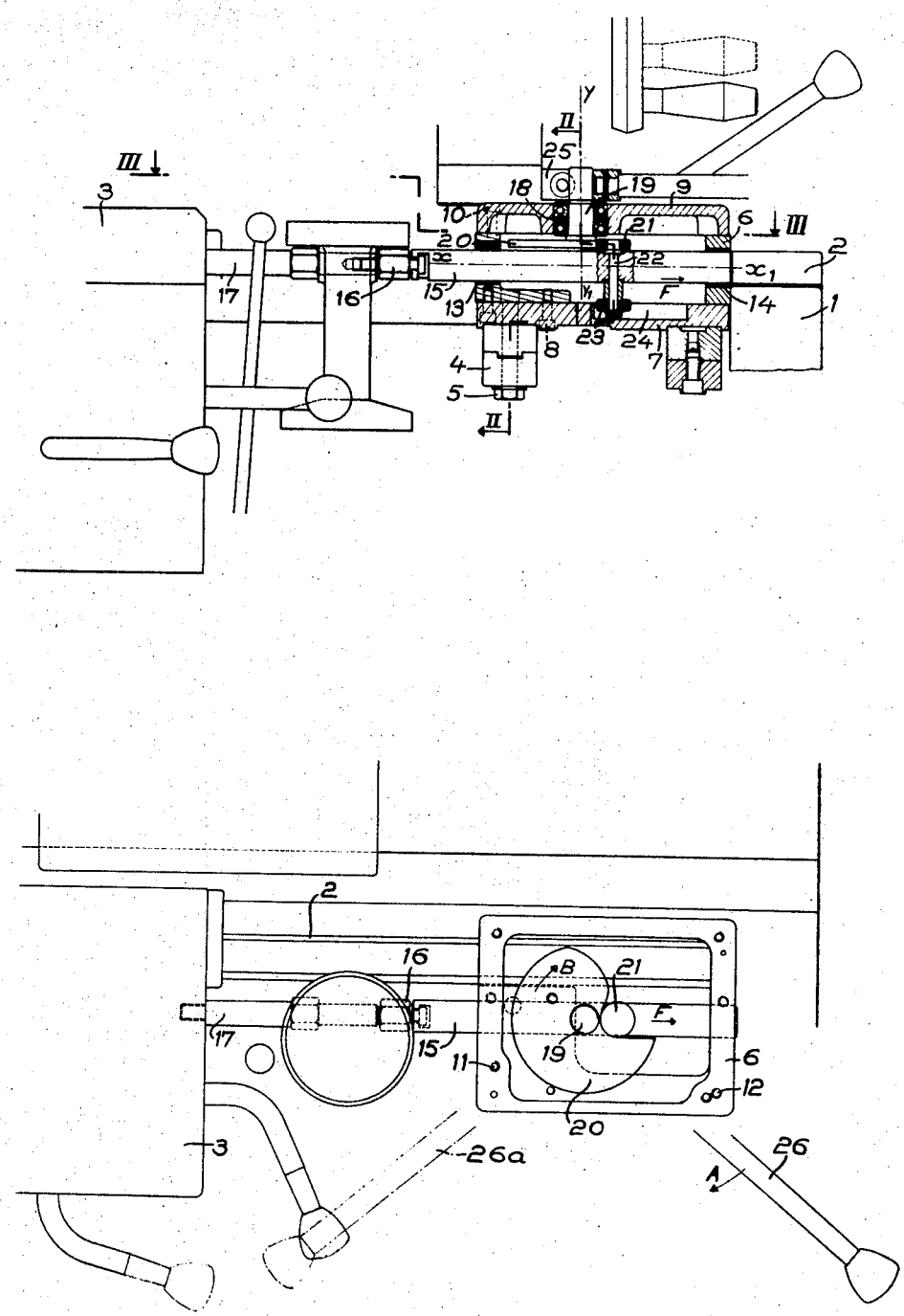

MACHINE TOOL CARRIAGES

The present invention relates to machine tools, and particularly to means for controlling the return of the slide to the starting point of a machining pass.

The tool-carrying slide of a machine tool, particularly a lathe is moved along slideways provided on the bed under the control of a manual control device that comprises a hand wheel for adjusting the departure position of a machining pass and, above all, for returning it to the starting point of the pass.

It is an object of the invention to replace the customary hand wheel control device and to simplify this operation which has to be repeated at each pass and which, for this reason, is extremely tiring for the operator.

In a machine tool having a bed with slideways on which a slide is arranged to move, the invention consists in a device that comprises a housing securable to said slideways and a rod mounted to move with said slide, said rod carrying a spindle on which is mounted a control wheel to rotate in cooperation with the periphery of a cam mounted to pivot in said housing about a pivot pin perpendicularly to said sliding rod and an operating lever being secured to said pivot pin.

In order that the invention may be more clearly understood, reference will now be made to the accompanying drawings which show one embodiment thereof by way of example only, and in which.

Figure 1:
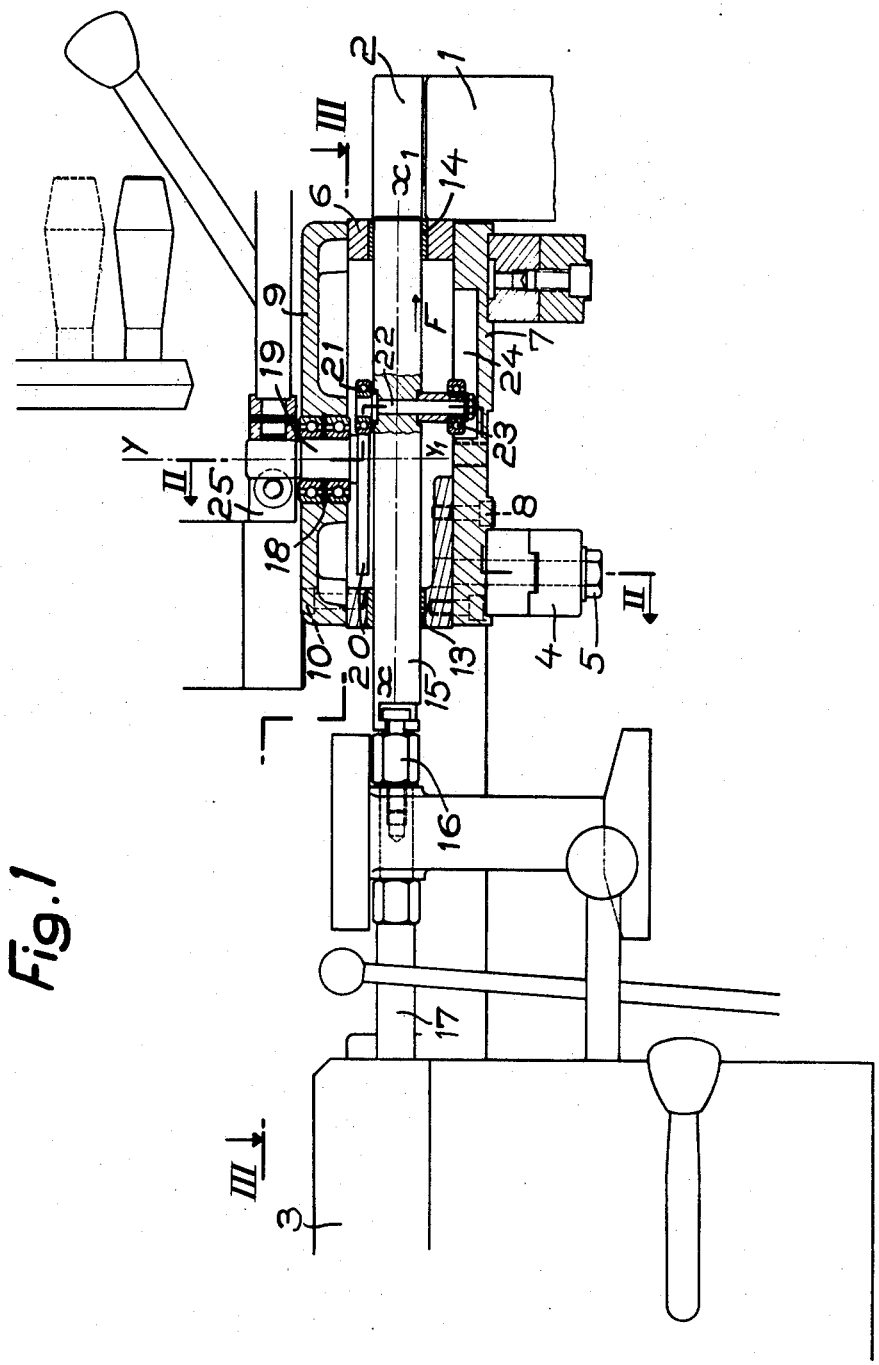
FIG. 1 shows an elevation, partly in section, of the device.
Figure 2:
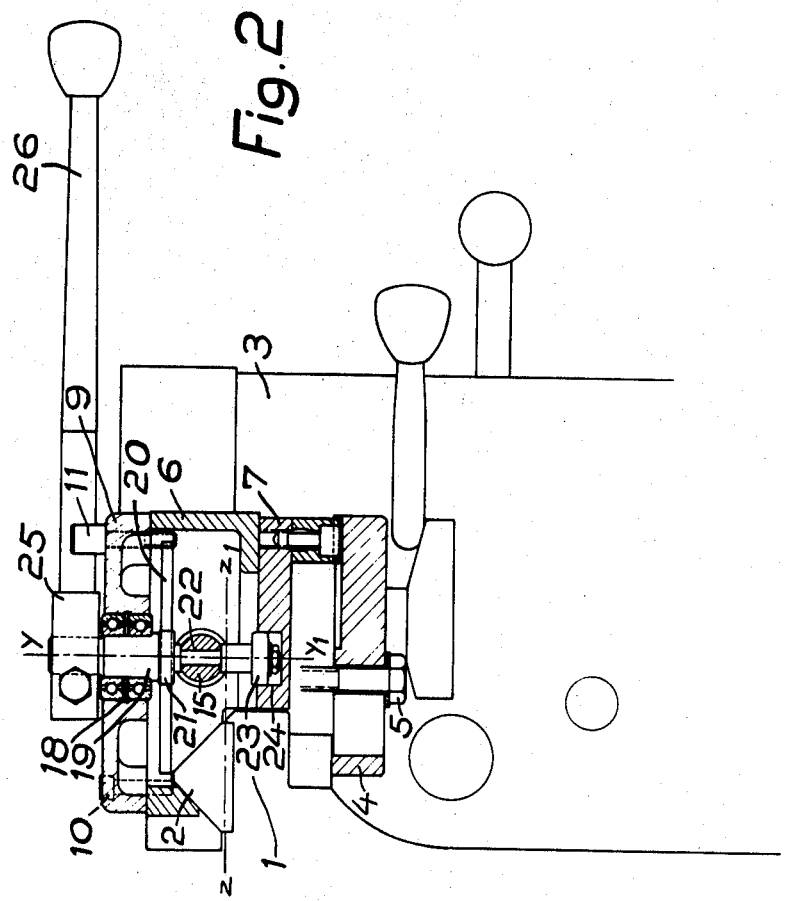
FIG. 2 shows a cross-section taken along the line II—II of FIG. 1.
Figure 3:
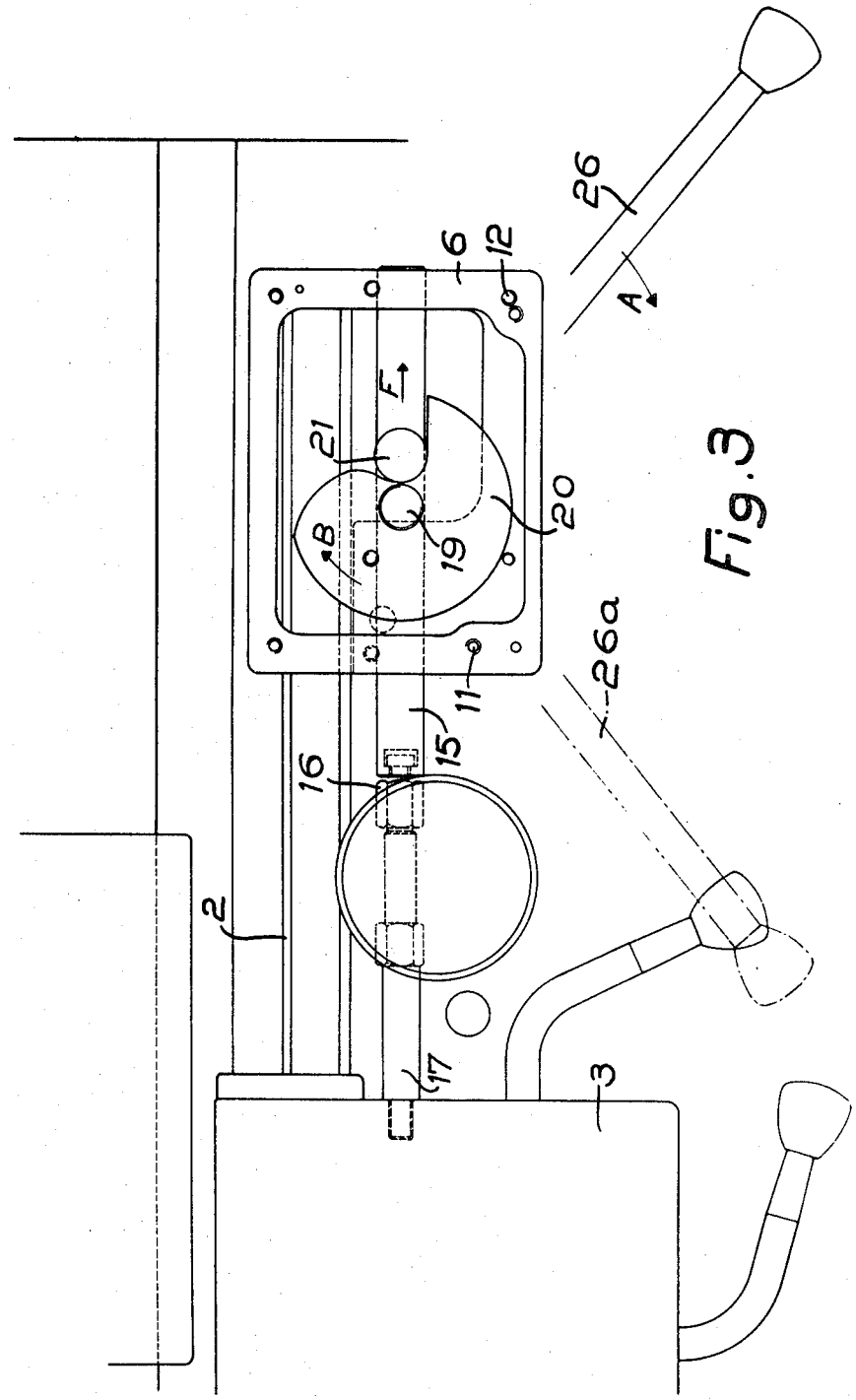
FIG. 3 is a plan view taken along the line III—III of FIG. 1.
Figure 4:
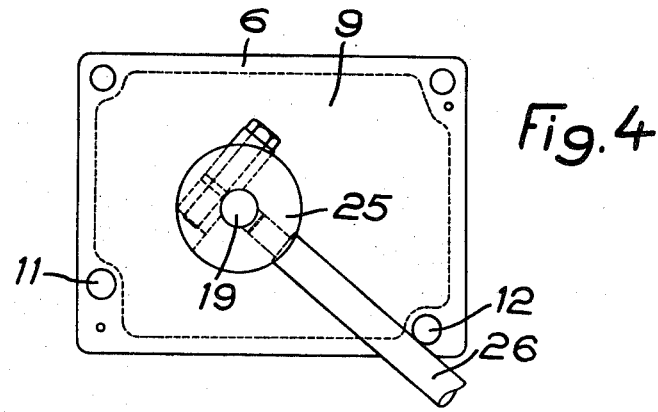
FIG. 4 is a plan view of the cover of the housing.

Referring now to the drawings, there is shown a lathe whose bed 1 is provided with slideways 2 on which a slide 3 is movable, as shown more particularly in FIGS. 1, 2 and 3.

A housing 6, the lower part of which is closed by a cover 7, secured thereto by screws 8, and the upper part of which is closed by a cover 9 secured thereto by screws 10, 11 and 12, is fixed on the slideways 2 of the bed 1 by means of a flange 4 and screws 5.

The housing 6 has two bores 13, 14 rectilinearly aligned in opposite walls thereof on an axis $x.x_1$ and through which slides a rod 15, one end of said rod being connected through a coupling member 16 to a rod 17 secured to the slide 3.

A bearing 18 comprising two ball bearings is provided in the upper cover 9 of the housing, and its axis $y.y_1$ is perpendicular to the plane of reference $z.z_1$ of the slideways 2 and cuts the axis $x.x_1$ of the rod 15. A pivot pin 19 is mounted in the bearing 18 and on its lower end carries a cam 20 formed by a spiral-shaped disc. On its upper end the pivot pin 19 is provided with a clamping collar 25 wherein an operating lever 26 is secured (FIGS. 1, 2, 3, 4).

The cam 20 cooperates with a control wheel 21 mounted to rotate on one of the ends of a spindle 22 passing through the rod 15. This spindle 22 carries, at its other end, a guide wheel 23 which moves in a rectilinear groove 24 formed in the lower cover 7 of the housing 6 and the axis of which is parallel to the axis $x.x_1$ of the sliding rod 15.

The device illustrated operates as follows.

The respective positions of the slide 3 and the cam 20 in FIG. 3 corresponds to the end of the machining pass, that is to say, to the time when the slide 3 has to be returned to the starting position.

On considering the angular position of the lever 26 secured to the pivot pin 19, it will be apparent that the movement of the lever 26 by the operator in the direction of the arrow A to bring it into position 26a causes the cam 20, also secured to pin 19, to pivot in the direction of the arrow B.

During this pivoting movement, the cam 20 acts on the wheel 21 secured to rod 15 and pushes the latter in the direction of arrow F so that the slide 3, which is connected to the rod 15 by the rod 17, is returned to the starting position of the following pass.

Figure 5:
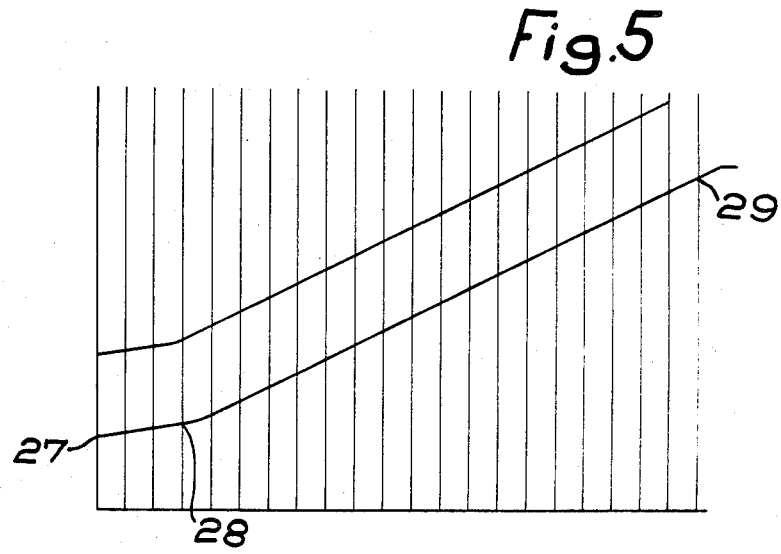
FIG. 5 is a diagram of the cam profile.

The diagram of the profile of the cam 20 shown in FIG. 5 indicates that the profile has a slight slope between points 27 to 28 so as to facilitate initiation of the return pass and to decrease the resulting stress on the lever 26.

The cam profile has a greater slope between the points 28 to 29 to obtain the necessary action to cause the slide 3 to return to the beginning as soon as the slide is moving.

The heads of the screws 11 and 12 form stops limiting the angular travel of the lever 26.

I claim:

1. A device for controlling the return to the start of a pass of a machine-tool carriage slidably mounted on slideways of a lathe bed comprising a housing securable to the slideways of the bed in which there is slidably mounted a rod rigidly connected with the carriage, said rod carrying a spindle on which is rotatably mounted a control wheel cooperating with a periphery of a cam pivotally mounted in the housing about a pivot pin positioned perpendicular to said sliding rod and an operating lever secured to said pivot pin, said cam having a spiral-shaped profile of small inclination corresponding to the starting stroke of the carriage and a larger inclination which corresponds to the return stroke of the carriage to the point of origin.

2. A device according to claim 1 wherein the longitudinal axis of said pivot pin on which said cam is mounted, is perpendicular to the plane of reference of said slideways and also cuts the longitudinal axis of said sliding rod.

3. A device according to claim 1 wherein a guide wheel is mounted to rotate about the axis of said control wheel, said guide wheel being disposed in a rectilinear groove in a lower cover of said housing, the longitudinal axis of said groove being parallel to that of said sliding rod.

4. A device according to claim 1 wherein the angular travel of said operating lever is limited by two stops on said housing.

* * * * *